(12) United States Patent
Kim

(10) Patent No.: US 12,493,926 B2
(45) Date of Patent: Dec. 9, 2025

(54) COMMUNICATION LIGHTING SYSTEM WITH AUTOMATIC IMAGE TRANSFORMATION FUNCTION

(71) Applicant: HYUNDAI MOBIS CO., LTD., Seoul (KR)

(72) Inventor: Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 388 days.

(21) Appl. No.: 18/146,419

(22) Filed: Dec. 26, 2022

(65) Prior Publication Data

US 2024/0144427 A1    May 2, 2024

(30) Foreign Application Priority Data

Nov. 2, 2022 (KR) .................. 10-2022-0144343

(51) Int. Cl.
| G06K 9/00 | (2022.01) |
| G06T 3/4053 | (2024.01) |
| G06V 10/141 | (2022.01) |
| G06V 10/25 | (2022.01) |
| G06V 10/56 | (2022.01) |
| G06V 10/60 | (2022.01) |

(52) U.S. Cl.
CPC .......... G06T 3/4053 (2013.01); G06V 10/141 (2022.01); G06V 10/25 (2022.01); G06V 10/56 (2022.01); G06V 10/60 (2022.01)

(58) Field of Classification Search
CPC ................................ G06T 3/4053; G06T 3/40
See application file for complete search history.

(56) References Cited

U.S. PATENT DOCUMENTS

| 2011/0211120 A1 | 9/2011 | Taniguchi et al. |
| 2021/0304355 A1* | 9/2021 | Delattre .................. G06T 1/20 |
| 2022/0084166 A1* | 3/2022 | Navarrete Michelini .......... G06N 3/048 |

FOREIGN PATENT DOCUMENTS

KR    20150042963 A    4/2015

OTHER PUBLICATIONS

Office Action issued on Jul. 8, 2024 in corresponding DE Patent Application No. 10 2022 214 285.3.
Interpolation (Fotografie). Date: Oct. 10, 2022. URL:https://web.archive.org/web/20221010093026/https://de.wikipedia.org/wiki/Interpolation_(Fotografie)#Interpolationsmethoden retrieved via URL: archive.org [searched on Jul. 8, 2024].
Skalierung (Computergrafik). Date: Jul. 5, 2022. URL:https://web.archive.org/web/20220705203016/https://de.wikipedia.org/wiki/Skalierung_(Computergrafik)#Skalierung_mit_Rekonstruktionsfilter retrieved via URL: archive.org [searched on Jul. 8, 2024].

* cited by examiner

Primary Examiner — Molly Wilburn
Assistant Examiner — Aidan Keup
(74) Attorney, Agent, or Firm — NovoTechIP International PLLC

(57) ABSTRACT

The present invention relates to a technology for automatically changing a size of output image data according to an output specification of a communication lighting system regardless of a size of an original image input to be projected using a lamp.

8 Claims, 10 Drawing Sheets a) ORIGINAL IMAGE(4*4)/ SAMPLING WINDOW(4*2)

b) ACTUAL COLOR VALUE OF ORIGINAL IMAGE TO WHICH IS SAMPLING WINDOW IS APPLIED c) COLOR VALUE CALCULATED BY APPLYING WEIGHT BASED ON AREA OF CORRESPONDING PIXEL a) ORIGINAL IMAGE(4*4)/
   SAMPLING WINDOW(4*2)

b) ACTUAL COLOR VALUE OF
   ORIGINAL IMAGE TO WHICH IS
   SAMPLING WINDOW IS APPLIED c) COLOR VALUE CALCULATED BY
   APPLYING WEIGHT BASED ON AREA
   OF CORRESPONDING PIXEL a) ORIGINAL IMAGE(4*4)/
SAMPLING WINDOW(8*4)

b) COLOR VALUE IS CALCULATED BY APPLYING WEIGHT BASED ON AREA OF CORRESPONDING PIXEL IN CASE WHERE ORIGINAL IMAGE EXISTS/
COLOR VALUS IS SET TO PREDETERMINED VALUE SET IN ADVANCE IN CASE WHERE ORIGINAL IMAGE DOES NOT EXIST a) ORIGINAL IMAGE(4*4)/
SAMPLING WINDOW(4*4)
DIFFERENT SAMPLING AREA FOR EACH PIXEL b) COLOR VALUE CALCULATED BY
APPLYING WEIGHT BASED ON AREA OF
CORRESPONDING PIXEL a) ORIGINAL IMAGE(8*4)

<LEFT>            <RIGHT> b) NON-OVERLAPPING PROJECTION MODE/SAMPLING WINDOW(4*4)

c) COLOR VALUE CALCULATED BY APPLYING WEIGHT BASED ON AREA OF CORRESPONDING PIXEL OF ORIGINAL IMAGE a) ORIGINAL IMAGE(8*4)

b) OVERLAPPING PROJECTION
MODE/SAMPLING WINDOW(4*4)

c) COLOR VALUE CALCULATED BY APPLYING WEIGHT BASED ON AREA OF CORRESPONDING PIXEL OF ORIGINAL IMAGE

COMMUNICATION LIGHTING SYSTEM WITH AUTOMATIC IMAGE TRANSFORMATION FUNCTION

CROSS-REFERENCE TO RELATED APPLICATIONS

This application claims priority under 35 U.S.C. § 119 to Korean Patent Application No. 10-2022-0144343, filed on Nov. 2, 2022, in the Korean Intellectual Property Office, the disclosure of which is incorporated herein by reference in its entirety.

TECHNICAL FIELD

The following disclosure relates to a communication lighting system with an automatic image transformation function, and in particular, to a communication lighting system with an automatic image transformation function that may automatically change a size of output image data projected through the communication lighting system.

More particularly, the following disclosure relates to a communication lighting system with an automatic image transformation function that may calculate an optimal pixel value to maintain a high image quality while changing a size.

BACKGROUND

As a high-resolution LED market gradually expands, applications for image projection are also gradually expanding.

In line with such a trend, a communication lighting technology for communicating and sympathizing with people has been proposed in the field of autonomous driving.

The communication lighting technology is a technology for communicating with pedestrians by projecting an icon or text that may indicate a direction or make a notification of an emergency situation on a road by using a lamp (for example, a digital micro-mirror device (DMD) with 400,000 pixels or more) attached on various regions of a vehicle.

In the era of autonomous driving, there will be no more traffic lights on a road, and a boundary between a sidewalk and a road will disappear. Therefore, a headlamp of a vehicle is in a trend of being linked with the communication lighting technology for communicating with pedestrians in addition to simply illuminating a traveling direction of the vehicle.

The biggest problem of such an image projection technology appears in an image transformation process due to a resolution difference between an input image (original image) and an output image.

In particular, in a case where such communication lighting technology is applied to a vehicle, since a lamp unit that projects light is installed in a process of designing the vehicle, the problems arise in a process of downsampling a resolution in a case where the resolution of the input image increases.

For example, since resolutions of an image that may be input with a DMD lamp so far have been set to 576*288, 1152*576, and 1152*1152, it is necessary to change the resolution through image processing according to the resolution of the input image. In this process, an image quality of the input image may deteriorate, which makes it difficult to properly deliver a content of a projected image.

In this regard, Korean Patent No. 10-2015-0042963 ("Projector Device") discloses a technology of changing a resolution of an input image to a projector-specific resolution.

SUMMARY

An embodiment of the present invention is directed to providing a communication lighting system with an automatic image transformation function that may automatically change a size of output image data according to an output specification of the communication light system regardless of a size of an original image data to be projected by the communication light system.

In particular, an embodiment of the present invention is directed to providing a communication lighting system with an automatic image transformation function that may maintain a resolution of input original image data by calculating the most optimal color value for each pixel of a transformed image.

In one general aspect, a communication lighting system with an automatic image transformation function includes: a condition setting unit setting an output condition for an output image having a predetermined first resolution; an image generation unit generating a sampling window having the same resolution as the resolution of the output image and generating the output image by applying the sampling window to an input original image having a predetermined second resolution according to the output condition set by the condition setting unit; and an image output unit including at least one light source and outputting a corresponding light control signal based on the output image.

In a case where the second resolution is higher than the first resolution, the image generation unit may apply the sampling window to an inside of the original image and calculate the output image by sampling the original image to which the sampling window is applied, and a value of each pixel of the output image may be set based on a value of a pixel of the original image at a sampling position corresponding to a position of each pixel.

In a case where the second resolution is lower than the first resolution, the image generation unit may apply the sampling window in such a way that the entire original image is within the sampling window, and calculate the output image by sampling the original image to which the sampling window is applied, a value of each pixel of the output image may be set based on a value of a pixel of the original image at a sampling position corresponding to a position of each pixel in a case where the original image exists at the sampling position, and the value of each pixel of the output image may be set to a predetermined value set in advance in a case where the original image does not exist at the sampling position.

The image generation unit may apply the sampling window in such a way that a center point of the sampling window and a center point of the original image coincide with each other.

The image generation unit may generate the sampling window in such a way that sampling areas, which are areas by which sampling for respective pixels of the sampling window is performed, are the same as each other.

The image generation unit may generate the sampling window in such a way that a sampling area, which is an area by which sampling for each pixel of the sampling window is performed, gradually decreases in one direction.

The image generation unit may generate the sampling window in such a way that a sampling area, which is an area by which sampling for each pixel of the sampling window is performed, varies depending on a projection distance of the output image received by the condition setting unit.

The image generation unit may generate the sampling window in such a way that a sampling area, which is an area by which sampling for each pixel of the sampling window is performed, increases as the received projection distance of the output image increases.

The image generation unit may set, in a case where a position of one pixel of the original image corresponds to any one pixel of the sampling window, a color value of a corresponding pixel of the output image based on a value of the corresponding pixel of the original image, and the image generation unit may set, in a case where positions of two or more pixels of the original image correspond to any one pixel of the sampling window, a color value of a corresponding pixel of the output image by applying a weight for a value of each pixel based on areas occupied by the corresponding pixels of the original image.

In another general aspect, a communication lighting system with an automatic image transformation function includes: a condition setting unit setting an output condition for a first output image having a predetermined 1-1-th resolution and a second output image having a predetermined 1-2-th resolution; an image generation unit generating a first sampling window having the same resolution as the resolution of the first output image and a second sampling window having the same resolution as the resolution of the second output image, and generating each of the output images by applying each of the first and second sampling windows to an input original image having a predetermined second resolution according to the output condition set by the condition setting unit; and an image output unit including a plurality of light sources and outputting a corresponding light control signal based on each of the output images.

In a case where the first output image and the second output image are set to a non-overlapping projection mode in the output condition set by the condition setting unit, the image generation unit may apply the first and second sampling windows to the original image in such a way that the first sampling window and the second sampling window meet each other at a center of the original image, and calculate the first output image and the second output image by sampling the original image to which each of the first and second sampling windows is applied, a value of each pixel of each corresponding output image may be set based on a value of a pixel of the original image at a sampling position corresponding to a position of each pixel in a case where the original image exists at the sampling position of each of the output images, and the value of each pixel of each corresponding output image may be set to a predetermined value set in advance in a case where the original image does not exist at the sampling position of each of the output images.

In a case where the first output image and the second output image are set to an overlapping projection mode in the output condition set by the condition setting unit, the image generation unit may apply the first and second sampling windows to the original image in such a way that the first sampling window and the second sampling window overlap each other in a predetermined region at a center of the original image, and calculate the first output image and the second output image by sampling the original image to which each of the first and second sampling windows is applied, a value of each pixel of each corresponding output image may be set based on a value of a pixel of the original image at a sampling position corresponding to a position of each pixel in a case where the original image exists at the sampling position of each of the output images, and the value of each pixel of each corresponding output image may be set to a predetermined value set in advance in a case where the original image does not exist at the sampling position of each of the output images.

The image generation unit may set a weight for each pixel of the predetermined region in which the first and second sampling windows overlap each other, in such a way that a brightness value gradually decreases as a distance from the center of the original image decreases to sample the original image to which each of the first and second sampling windows is applied.

The image generation unit may generate each of the sampling windows in such a way that sampling areas, which are areas by which sampling for respective pixels of each of the sampling windows is performed, are the same as each other.

The image generation unit may generate each of the sampling windows in such a way that a sampling area, which is an area by which sampling for each pixel of each of the sampling windows is performed, gradually decreases in one direction.

The image generation unit may generate the sampling windows in such a way that a sampling area, which is an area by which sampling for each pixel of each of the sampling windows is performed, varies depending on projection distances of the first and second output images received by the condition setting unit.

The image generation unit may generate the sampling windows in such a way that a sampling area, which is an area by which sampling for each pixel of each of the sampling windows is performed, increases as the received projection distances of the first and second output images increase.

For each sampling window, the image generation unit may set, in a case where a position of one pixel of the original image corresponds to any one pixel of the sampling window, a color value of a corresponding pixel of the output image based on a value of the corresponding pixel of the original image, and the image generation unit may set, in a case where positions of two or more pixels of the original image correspond to any one pixel of the sampling window, a color value of a corresponding pixel of the output image by applying a weight for a value of each pixel based on areas occupied by the corresponding pixels of the original image.

DETAILED DESCRIPTION OF EMBODIMENTS

Figure 1:
FIG. 1 is an exemplary configuration diagram illustrating a communication lighting system with an automatic image transformation function according to an embodiment of the present invention.

Objects, features and advantages of the present invention described above will become more apparent through the following embodiments associated with the accompanying drawings. The following specific structural or functional descriptions are merely illustrated for the purpose of describing embodiments according to the concept of the present invention. The embodiments according to the concept of the present invention may be implemented in various forms and are not to be construed as being limited to embodiments described in the present specification or application. Since embodiments according to the concept of the present invention may be variously modified and may have several forms, specific embodiments will be illustrated in the accompanying drawings and will be described in detail in the present specification or application. However, it is to be understood that the present disclosure is not limited to specific embodiments, but includes all modifications, equivalents, and substitutions falling in the spirit and the scope of the present disclosure. Terms such as "first" and/or "second" may be used to describe various components, but these components are not limited to these terms. The terms are used only to distinguish one component from other components. For example, a first component may be named a second component and the second component may also be named the first component, without departing from the scope of the present invention. It is to be understood that when one component is referred to as being connected to or coupled to another component, it may be connected directly to or coupled directly to another component or be connected to or coupled to another component with the other component interposed therebetween. On the other hand, it is to be understood that when one component is referred to as being connected directly to or coupled directly to another component, it may be connected to or coupled to another component without the other component interposed therebetween. Other expressions for describing a relationship between components, that is, "between", "directly between", "neighboring to", "directly neighboring to" and the like, should be similarly interpreted. Terms used in the present specification are used only in order to describe specific embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof stated in the present specification, but do not preclude the presence or addition of one or more other features, numerals, steps, operations, components, parts, or a combination thereof. Unless defined otherwise, it is to be understood that all the terms used in the present specification including technical and scientific terms have the same meanings as those generally understood by those skilled in the art to which the present invention pertains. Terms generally used and defined in a dictionary are to be interpreted as the same meanings with meanings within the context of the related art, and are not to be interpreted as ideal or excessively formal meanings unless clearly indicated in the present specification. Hereinafter, exemplary embodiments of the present invention will be described in detail with reference to the accompanying drawings. The same reference numerals in each drawing denote the same components.

In addition, a system refers to a set of components including devices, mechanisms, means, and the like, systematized in order to perform required functions and regularly interacting with one another.

A communication lighting system with an automatic image transformation function according to an embodiment of the present invention has an advantage in that a resolution may be uniformly changed according to a resolution of an output unit (lamp) regardless of a difference in resolution of an original image to be projected through the lamp and it is thus possible to increase convenience in the use of the communication lighting system.

An image resolution refers to the number of pixels used to express the image, and a measure of the image resolution is the number of pixels per inch.

Naturally, the higher the resolution, the clearer and sharper the image looks. However, since the number of pixels increases, a large amount of computation is required. Therefore, an input original image is transformed according to an output resolution optimized for the output unit.

The communication lighting system with an automatic image transformation function according to an embodiment of the present invention is described limited to vehicles in which the communication lighting system is most actively used, but this is only an example of the present invention, and the communication lighting system with an automatic image transformation function may be applied to all fields in which a communication lighting technology is desired to be utilized with the lamp.

However, a description of the communication lighting system with an automatic image transformation function according to an embodiment of the present invention will be limited to the field of vehicles for a smooth explanation.

The communication lighting system applied to the field of vehicles includes: a power supply unit receiving operation electric energy from a vehicle battery; a sensor unit sensing information regarding surroundings of a vehicle from a camera mounted on the vehicle or a distance sensor; an interface unit receiving sensing information and transferring the sensing information to the vehicle; a memory unit storing an original image to be output; a control unit performing image processing based on the sensing information and generating a light control signal to generate an output image by using the original image; and a light output unit generating light and controlling an operation state of the lamp according to the light control signal.

In consideration of this point, the communication lighting system with an automatic image transformation function according to an embodiment of the present invention limits a detailed operation in which the control unit performs image processing. As a result, the resolution is uniformly changed according to the resolution of the output unit regardless of a difference in resolution of the original image to be projected through the lamp.

The communication lighting system with an automatic image transformation function according to an embodiment of the present invention may include one or more communication lighting units (light source units) according to a design specification of the vehicle.

Generally, the vehicle includes two headlamps on the front side. However, recently, the vehicle is designed to include one lamp in which a radiator grill and a head lamp are integrated or is designed to include a total of four lamps (quad-lamp) in which pairs of two headlamps are positioned at left and right sides, and the number of light source units is not necessarily limited to a specific number.

As illustrated in FIG. 1, the communication lighting system with an automatic image transformation function according to an embodiment of the present invention includes a condition setting unit 100, an image generation unit 200, and an image output unit 300. It is preferable that each component performs an operation through an arithmetic processing unit such as an electronic control unit (ECU) including a computer that performs transmission and reception through an in-vehicle communication channel.

Each component in a case where one light source unit is included as a first example of the communication lighting system with an automatic image transformation function according to an embodiment of the present invention will be described in detail. It is preferable that the condition setting unit 100 sets an output condition for an output image having a predetermined first resolution.

Here, the predetermined first resolution of the output image is set according to an output specification of the light source unit (lamp) provided in the communication lighting system, and for example, any one of resolutions 576*288, 1152*576, and 1152*1152, for a digital micro-mirror device (DMD) lamp applied to the communication lighting system so far, is selected and set.

The condition setting unit 100 sets the output condition according to the design specification of the vehicle, and the output condition includes a distance, a position, a region, and the like for projection of the output image based on the vehicle.

For example, in a case where the communication lighting system detects a pedestrian on a road without a crosswalk in front of the vehicle, the vehicle stops at a certain distance from the detected pedestrian, and an image of a crosswalk is projected from the vehicle, so that the pedestrian may safely walk on the road.

In this case, in a case where pedestrian sensing information is input, the condition setting unit 100 sets the output condition in such a way that an image of a crosswalk among images stored in the memory unit may be output at a position away from the vehicle by a set distance.

Since such an output condition may be set differently depending on various applications of the communication lighting system, in the present invention, it is preferable that the output condition that needs to be set includes a projection distance (a point on which the output image is to be projected, in a region away from the vehicle by a predetermined distance) that may have the greatest effect on an image resolution, and the resolution (first resolution) of the output image set according to the output specification of the light source unit (lamp).

The image generation unit 200 generates a sampling window having the same resolution as the output image, and generates the output image by applying the sampling window to an input original image having a predetermined second resolution according to the output condition set by the condition setting unit.

Here, the predetermined second resolution of the original image is literally the resolution of the input image to be output, and may be freely input. Therefore, the resolution itself is not limited.

The sampling window is generated to have the first resolution, in other words, the sampling window is generated according to the number of pixels of the resolution of the output image.

The sampling window is generated by extracting only a region corresponding to the sampling window from the input image, and it is preferable that the sampling window is considered to be the opposite of image masking.

Figure 2:
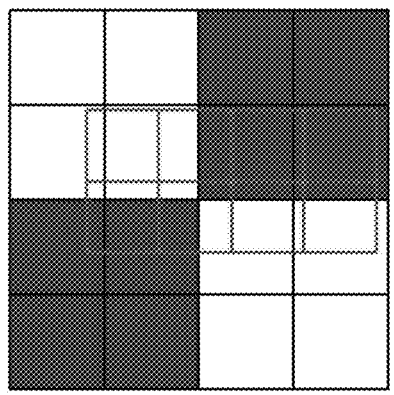
FIGS. 2 to 9 are exemplary diagrams illustrating an image transformation process by the communication lighting system with an automatic image transformation function according to an embodiment of the present invention.
Figure 2:
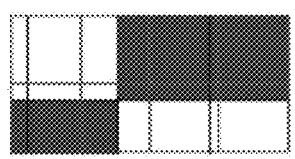
Figure 2:
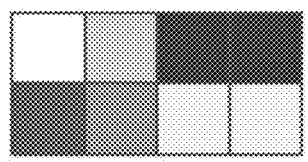

As illustrated in FIGS. 2A to 2C, in a case where the second resolution (the resolution of the original image) is higher than the first resolution (the resolution of the output image), the image generation unit 200 applies the sampling window to the inside of the original image to sample the original image to which the sampling window is applied and calculate the output image.

In this case, in a process of applying the sampling window to the inside of the original image, it is most preferable to apply the sampling window in such a way that a center point (center coordinates) of the sampling window and a center point (center coordinates) of the original image coincide with each other. It is a matter of course that this is only one example of the present invention, and in a case where a separate region of interest (ROI) is set for the original image, it is preferable to apply the sampling window in such a way as to include the ROI, and a position at which the sampling window is applied is not limited.

When generating the output image by sampling the original image to which the sampling window is applied, the image generation unit 200 also performs sampling on a value of each pixel of the output image.

The value of each pixel of the output image is set based on a value of a pixel of the original image at a sampling position corresponding to a position of each pixel. In other words, in order to determine a color value for one pixel of the sampling window, the setting is performed based on the value of the pixel of the original image that corresponds to the sampling window.

In the process of applying the sampling window to the original image, the number of pixels of the original image that corresponds to one pixel of the sampling window may be one in a case where a position of one pixel of the original image corresponds to any one pixel of the sampling window, that is, the number of pixels of the original image that corresponds to one pixel of the sampling window may be one according to a correspondence position. In this case, a color value of the corresponding pixel of the sampling window is set based on the value of the corresponding pixel of the original image, and the color value of the corresponding pixel of the output image is set accordingly. At this time, since only one pixel is included in the color value setting, it is most preferable to set the value of the pixel of the original image as it is.

Figure 10:
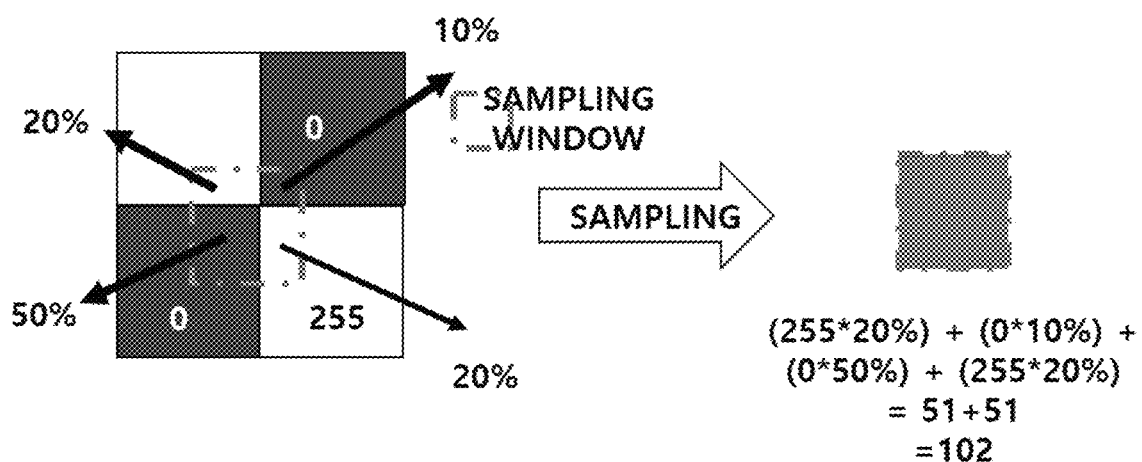
FIG. 10 is an exemplary diagram illustrating a process of setting a pixel value of an output image based on a pixel value of an original image by the communication lighting system with an automatic image transformation function according to an embodiment of the present invention.

However, as illustrated in FIG. 10, in the process of applying the sampling window to the original image, the number of pixels of the original image that corresponds to one pixel of the sampling window may be plural in a case where positions of the plurality of pixels of the original image correspond to any one pixel of the sampling window, that is, the number of pixels of the original image that corresponds to one pixel of the sampling window may be plural according to correspondence positions. In this case, the color value of the corresponding pixel of the sampling window is set by applying a weight for the value of each pixel based on an area occupied by each of the corresponding pixels of the original image, and the color value of the corresponding pixel of the output image is set accordingly.

For example, in a case where three pixels of the original image correspond to any one pixel of the sampling window, the area occupied by each of the three pixels (60% for pixel A, 30% for pixel B, and 10% for pixel C) is used. A weight of 60% is applied to the color value of pixel A, a weight of 30% is applied to the color value of pixel B, and a weight of 10% is applied to the color value of pixel C, thereby setting the color value of the corresponding pixel of the sampling window.

In FIG. 10, since light output from the vehicle is in grayscale, the light is expressed using only one data of RGB, a value of 0 indicates black, and a value of 255 indicates white. Accordingly, the value of each pixel of the original image set to a value between 0 and 255 is used, and the color value of the corresponding pixel of the sampling window may be calculated by applying the weight for the value of each pixel based on the area of the corresponding pixel, thereby setting the color value of the corresponding pixel of the output image.

In this regard, FIG. 2A is an exemplary diagram illustrating a state in which the sampling window is applied to the inside of the original image, FIG. 2B is an exemplary diagram illustrating an actual color value of the original image to which the sampling window is applied, and FIG. 2C is an exemplary diagram illustrating the color value of the output image set based on the color value of the original image to which the sampling window is applied.

Figure 3:
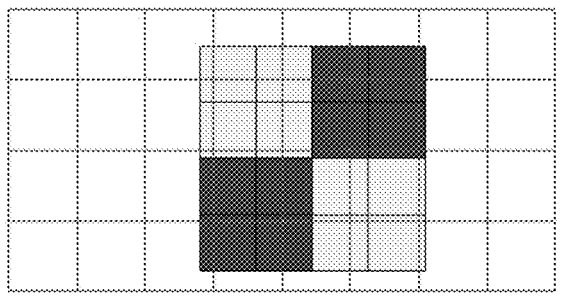
Figure 3:
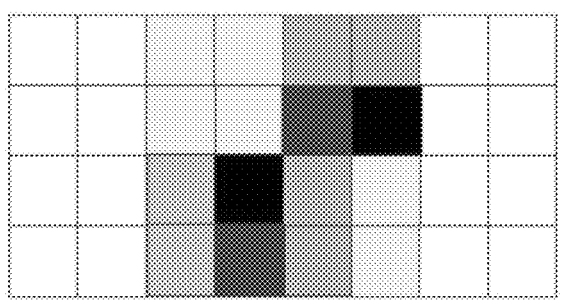

As illustrated in FIGS. 3A and 3B, in a case where the second resolution (the resolution of the original image) is lower than the first resolution (the resolution of the output image), the image generation unit 200 applies the sampling window in such a way that the entire original image is within the sampling window to sample the original image to which the sampling window is applied and calculate the output image.

In this case, in a process of applying the sampling window to the original image, it is most preferable to apply the sampling window in such a way that the center point (center coordinates) of the sampling window and the center point (center coordinates) of the original image coincide with each other. However, this is only an example of the present invention, and the application position is not limited thereto.

When the image generation unit 200 generates the output image by sampling the original image to which the sampling window is applied, in a case where the second resolution (the resolution of the original image) is lower than the first resolution (the resolution of the output image), both a position where the original image exists and a position where the original image does not exist are within the sampling position of the sampling window.

Accordingly, in a case where the original image exists at the sampling position, the image generation unit 200 sets the value of each pixel of the output image based on the value of the pixel of the original image at the sampling position corresponding to the position of each pixel.

At this time, as described above, in a case where the position of one pixel of the original image corresponds to any one pixel of the sampling window, the color value of the corresponding pixel of the sampling window is set based on the value of the corresponding pixel of the original image, and the color value of the corresponding pixel of the output image is set accordingly. At this time, since only one pixel is included in the color value setting, it is most preferable to set the value of the pixel of the original image as it is.

It is a matter of course that, in a case where the positions of the plurality of pixels of the original image correspond to any one pixel of the sampling window, the color value of the corresponding pixel of the sampling window is set by applying the weight for the value of each pixel based on the area occupied by each of the corresponding pixels of the original image, and the color value of the corresponding pixel of the output image is set accordingly. A detailed operation is the same as described above.

In a case where the original image does not exist at the sampling position, the image generation unit 200 sets the value of each pixel of the output image to a predetermined value set in advance.

In other words, since the value of the corresponding pixel of the original image does not exist, it is not possible to set the color value based on the original image. Accordingly, the color value of the pixel at which the original image does not exist is set to the predetermined value set in advance.

At this time, it is preferable that the predetermined value set in advance is set by the condition setting unit 100.

The condition setting unit 100 receives and sets a color similar to the original image or a color that does not interfere with the meaning that the original image intends to represent, depending on the use of the original image stored in the memory unit. Alternatively, in a case where the grayscale is applied, the color value may be set to 0 to increase transparency.

In this regard, FIG. 3A is an exemplary diagram illustrating a state in which the sampling window is applied to the original image, and FIG. 3B is an exemplary diagram illustrating the color value of the output image set based on the color value of the original image to which the sampling window is applied, and is an exemplary diagram illustrating a state in which a region where the original image does not exist is expressed transparently based on the grayscale.

At this time, in a process of generating the sampling window having the same resolution as that of the output image, it is preferable that the image generation unit 200 generates the sampling window in such a way that sampling areas, which are areas by which sampling for the respective pixels of the sampling window is performed, are the same as each other.

That is, as illustrated in FIGS. 2A to 3B, the sampling areas, which are the areas by which sampling of the original image for the respective pixels of the sampling window is performed, are the same as each other.

Alternatively, in the process of generating the sampling window having the same resolution as that of the output image, the image generation unit 200 may generate the sampling window in such a way that the sampling area, which is an area by which sampling for each pixel of the sampling window is performed, gradually decreases in one direction.

Figure 4:
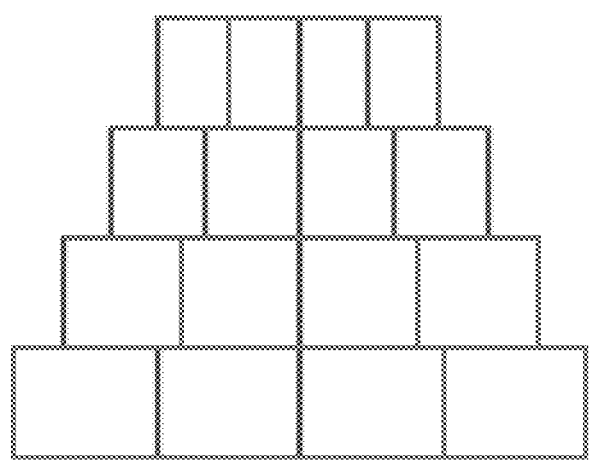

That is, as illustrated in FIG. 4, in a case where the original image is output as an image continuous from the vehicle to a specific point due to the use of the original image stored in the memory unit, the continuous image is output in such a way that an image region close to the vehicle has a large width, and an image region away from the vehicle has a small width in perspective. Accordingly, the sampling window may also be generated in such a way as to gradually decrease in size in one direction in order to generate the output image in which the original image is projected in perspective.

Figure 5:
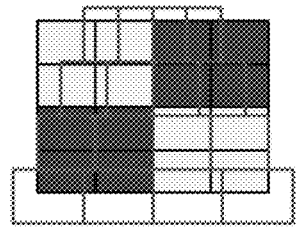
Figure 5:
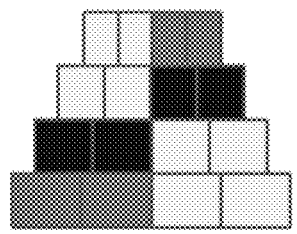

FIGS. 5A and 5B are exemplary diagrams illustrating a case where the output image is generated using the sampling window of FIG. 4.

As illustrated in FIGS. 5A and 5B, although the original image and the output image have the same resolution, the sampling area of the sampling window is different for each pixel. Therefore, as illustrated in FIG. 5B, the value of each pixel of the output image is set based on the value of the pixel of the original image at the sampling position corresponding to the position of each pixel.

Figure 6:
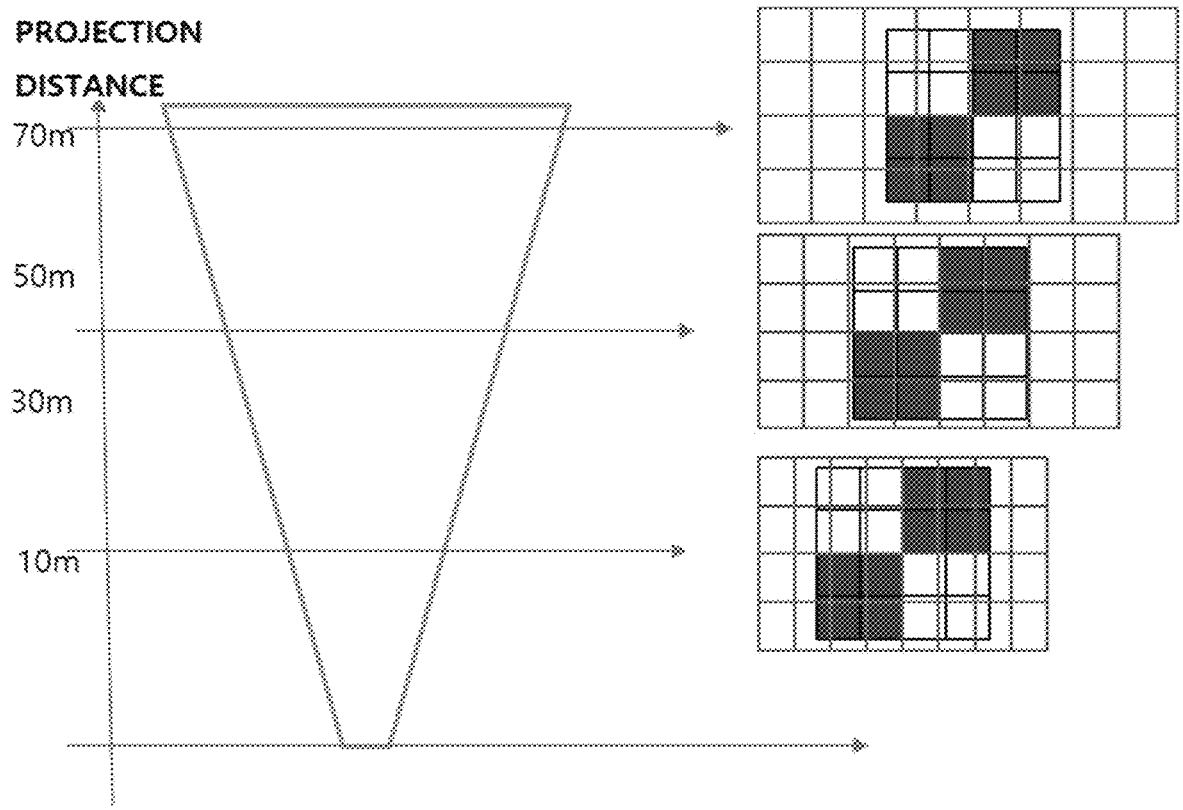

In addition, as illustrated in FIG. 6, it is preferable that the image generation unit 200 generates the sampling window in such a way that the sampling area, which is an area by which sampling for each pixel of the sampling window is performed, varies depending on a projection distance of the output image received by the condition setting unit 100.

It is most preferable that the image generation unit 200 generates the sampling window in such a way that the sampling area, which is an area for which sampling for each pixel of the sampling window is performed, increases as the projection distance of the output image received by the condition setting unit 100 increases.

That is, since a projection region of the image becomes wider as the projection distance increases, a larger sampling area for the sampling window is set. In other words, the original image is relatively reduced in size.

The image output unit 300 outputs a corresponding light control signal based on the output image transmitted by the image generation unit 200. That is, the image output unit 300 includes the light source unit, and since a process of receiving and outputting the light control signal by the light source unit corresponds to an ordinary technology, a detailed description thereof will be omitted.

Each component in a case where a plurality of light source units are included as a second example of the communication lighting system with an automatic image transformation function according to an embodiment of the present invention will be described in detail. It is preferable that the condition setting unit 100 sets an output condition for a first output image having a predetermined 1-1-th resolution and a second output image having a predetermined 1-2-th resolution.

In this case, since the number of light source units is plural, the number of output images is also set to be plural.

Here, the resolution of the output image is set according to an output specification of the light source unit (lamp) provided in the communication lighting system, and for example, any one of resolutions 576*288, 1152*576, and 1152*1152, for the digital micro-mirror device (DMD) lamp applied to the communication lighting system so far, is selected and set.

The condition setting unit 100 sets the output condition according to the design specification of the vehicle, and the output condition includes a distance, a position, a region, and the like for projection of the output image based on the vehicle.

Since such an output condition may be set differently depending on various applications of the communication lighting system, in the present invention, it is preferable that the output condition that needs to be set includes a projection distance (a point on which the output image is to be projected, in a region away from the vehicle by a predetermined distance) that may have the greatest effect on the image resolution, and the resolutions (the 1-1-th resolution and the 1-2-th resolution) of the first and second output images set according to the output specification of the plurality of light source units (lamps).

It is preferable that the image generation unit 200 generates a first sampling window having the same resolution as that of the first output image and a second sampling window having the same resolution as that of the second output image.

The image generation unit 200 generates the first and second output images by applying the generated first and second sampling windows to the input original image having the predetermined second resolution according to the output condition set by the condition setting unit.

Here, the predetermined second resolution of the original image is literally the resolution of the input image to be output, and may be freely input. Therefore, the resolution itself is not limited.

The first and second sampling windows are generated to have the 1-1-th resolution and the 1-2-th resolution, respectively. In other words, the sampling window is generated according to the number of pixels of the resolution of each of the first and second output images.

The sampling window is generated by extracting only a region corresponding to the sampling window from the input image, and it is preferable that the sampling window is considered to be the opposite of image masking.

Figure 7:
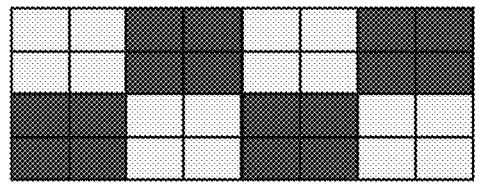
Figure 7:
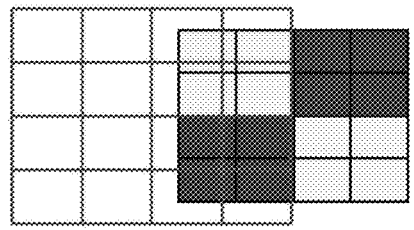
Figure 7:
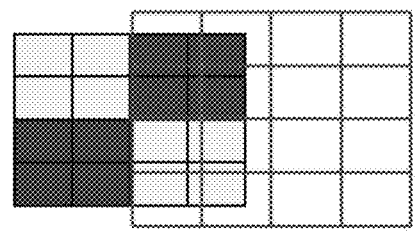
Figure 7:
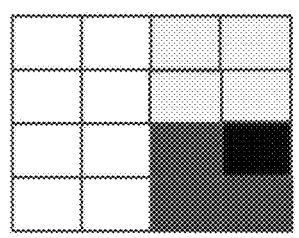
Figure 7:
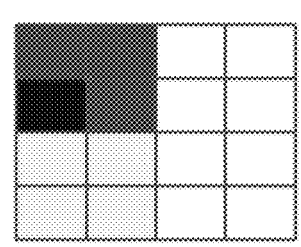

As illustrated in FIGS. 7A to 7C, in a case where the first output image and the second output image are set to a non-overlapping projection mode in the output condition set by the condition setting unit 100, the image generation unit 200 applies the first sampling window and the second sampling window to the original image in such a way that the first sampling window and the second sampling window meet each other at the center of the original image.

In FIGS. 7A to 7C, the first sampling window and the second sampling window are applied to the original image based on a central vertical axis. However, this is only an example of the present invention, and the first sampling window and the second sampling window may also be applied to the original image based on a central horizontal axis according to arrangement of the light source units. In addition, in a case where the number of light source units is three or more, three or more sampling windows are applied to the original image in such a way as not to overlap one another, so that three or more output images are projected without overlapping with one another.

The image generation unit 200 generates each output image by sampling the original image to which each sampling window is applied.

At this time, in a case where the original image exists at the sampling position, the value of each pixel of each output image is set based on the value of the pixel of the original image at the corresponding sampling position.

At this time, in a case where the position of one pixel of the original image corresponds to any one pixel of the sampling window, the color value of the corresponding pixel of the sampling window is set based on the value of the corresponding pixel of the original image, and the color value of the corresponding pixel of the output image is set accordingly. At this time, since only one pixel is included in the color value setting, it is most preferable to set the value of the pixel of the original image as it is.

It is a matter of course that, in a case where the positions of the plurality of pixels of the original image correspond to any one pixel of the sampling window, the color value of the corresponding pixel of the sampling window is set by applying the weight for the value of each pixel based on the area occupied by each of the corresponding pixels of the original image, and the color value of the corresponding pixel of the output image is set accordingly. A detailed operation is the same as described above.

Further, in a case where the original image does not exist at the sampling position, the value of each pixel of each output image is set to a predetermined value set in advance.

In other words, since the value of the corresponding pixel of the original image does not exist, it is not possible to set the color value based on the original image. Accordingly, the color value of the pixel at which the original image does not exist is set to the predetermined value set in advance.

At this time, it is preferable that the predetermined value set in advance is set by the condition setting unit 100.

The condition setting unit 100 receives and sets a color similar to the original image or a color that does not interfere with the meaning that the original image intends to represent, depending on the use of the original image stored in the memory unit. Alternatively, in a case where the grayscale is applied, the color value may be set to 0 to increase transparency.

Figure 8:
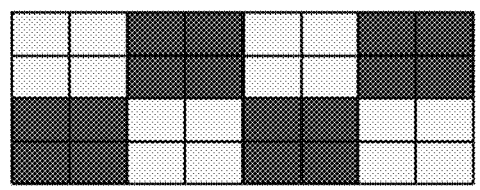
Figure 8:
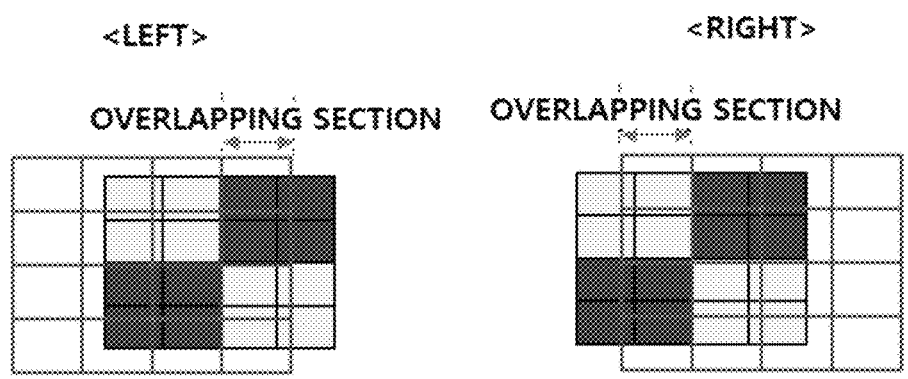
Figure 8:

As illustrated in FIGS. 8A to 8C, in a case where the first output image and the second output image are set to an overlapping projection mode in the output condition set by the condition setting unit 100, the image generation unit 200 applies the first sampling window and the second sampling window to the original image in such a way that the first sampling window and the second sampling window overlap each other in a predetermined region at the center of the original image.

The image generation unit 200 generates each output image by sampling the original image to which each sampling window is applied.

Here, the predetermined region in which the first sampling window and the second sampling window overlap each other corresponds to the output condition set by the condition setting unit 100. The predetermined region in which the first sampling window and the second sampling window overlap each other is set according to the use of the original image stored in the memory unit, and the size of the predetermined region itself is not limited.

In FIGS. 8A to 8C, the first sampling window and the second sampling window are applied to the original image in such a way that the first sampling window and the second sampling window overlap each other in the predetermined region based on a central vertical axis. However, this is only an example of the present invention, and the first sampling window and the second sampling window may also be applied to the original image in such a way that the first sampling window and the second sampling window overlap each other in a predetermined region based on a central horizontal axis according to arrangement of the light source units. In addition, in a case where the number of light source units is three or more, three or more sampling windows are applied to the original image in such a way as to overlap one another, so that three or more output images are projected while overlapping with one another.

The image generation unit 200 generates each output image by sampling the original image to which each sampling window is applied.

At this time, in a case where the original image exists at the sampling position, the value of each pixel of each output image is set based on the value of the pixel of the original image at the corresponding sampling position.

At this time, in a case where the position of one pixel of the original image corresponds to any one pixel of the sampling window, the color value of the corresponding pixel of the sampling window is set based on the value of the corresponding pixel of the original image, and the color value of the corresponding pixel of the output image is set accordingly. At this time, since only one pixel is included in the color value setting, it is most preferable to set the value of the pixel of the original image as it is.

It is a matter of course that, in a case where the positions of the plurality of pixels of the original image correspond to any one pixel of the sampling window, the color value of the corresponding pixel of the sampling window is set by applying the weight for the value of each pixel based on the area occupied by each of the corresponding pixels of the original image, and the color value of the corresponding pixel of the output image is set accordingly. A detailed operation is the same as described above.

Further, in a case where the original image does not exist at the sampling position, the value of each pixel of each output image is set to a predetermined value set in advance.

In other words, since the value of the corresponding pixel of the original image does not exist, it is not possible to set the color value based on the original image. Accordingly, the color value of the pixel at which the original image does not exist is set to the predetermined value set in advance.

At this time, it is preferable that the predetermined value set in advance is set by the condition setting unit 100.

The condition setting unit 100 receives and sets a color similar to the original image or a color that does not interfere with the meaning that the original image intends to represent, depending on the use of the original image stored in the memory unit. Alternatively, in a case where the grayscale is applied, the color value may be set to 0 to increase transparency.

However, it is preferable that the image generation unit 200 sets a weight for each pixel of the predetermined region in which the first and second sampling windows overlap each other, in such a way that a brightness value gradually decreases as a distance from the center of the original image decreases to sample the original image to which each of the first and second sampling windows is applied.

That is, since the sampled output images are projected while overlapping each other in the predetermined region in which the first and second sampling windows overlap each other, the color value of the predetermined region in which the first and second sampling windows overlap each other may be darker than that of a region in which the first and second sampling windows do not overlap each other.

Figure 9:
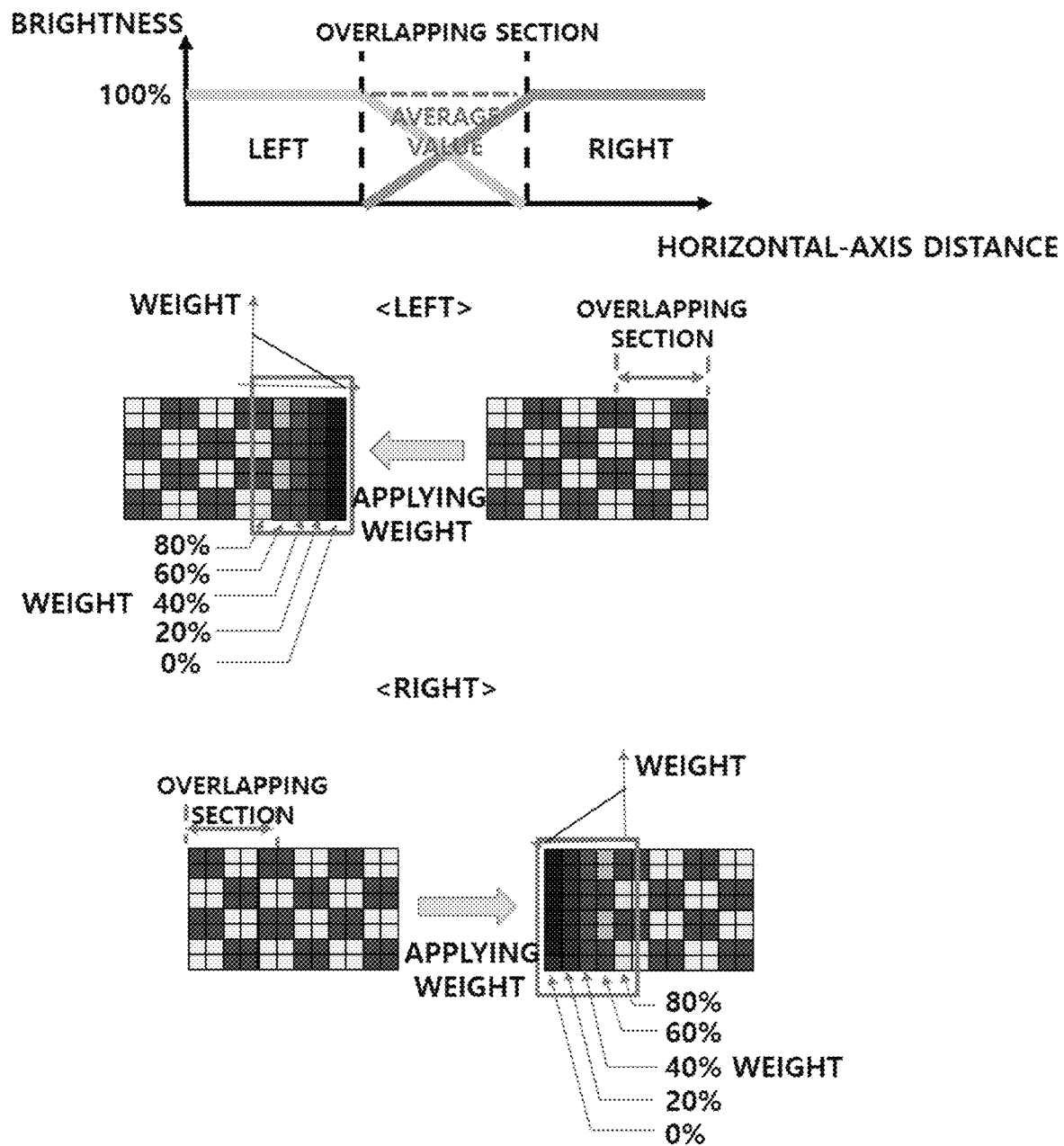

Therefore, in a section where left/right images overlap each other, it is preferable to solve this problem by linearly decreasing the brightness value as a distance from the center decreases as illustrated in FIG. 9.

It is preferable to consider that the lower the transparency, the lower the color value and the lower the brightness value, and the higher the transparency, the higher the color value and the higher the brightness value together.

In a case where the color value is expressed as RGB data, the brightness value is adjusted by applying a weight on the color value. It is a matter of course that, in a case where the color value is expressed as RGBA data, the transparency value itself may be controlled.

At this time, in a process of generating each sampling window having the same resolution as that of each output image, it is preferable that the image generation unit 200 generates the sampling window in such a way that sampling areas, which are areas by which sampling for the respective pixels of the sampling window is performed, are the same as each other.

Alternatively, the sampling window may be generated in such a way that the sampling area, which is an area by which sampling for each pixel of the sampling window is performed, gradually decreases in one direction.

Since a detailed example of the sampling area is the same as the first example of the communication lighting system with an automatic image transformation function according to an embodiment of the present invention, a description thereof will be omitted.

In addition, it is preferable that the image generation unit 200 generates the first and second sampling windows in such a way that the sampling area, which is an area by which sampling for each pixel of the corresponding sampling window is performed, varies depending on the projection distances of the first and second output images received by the condition setting unit 100.

It is most preferable that the image generation unit 200 generates the sampling window in such a way that the sampling area, which is an area for which sampling for each pixel of the sampling window is performed, increases as the projection distance of the output image received by the condition setting unit 100 increases.

That is, since a projection region of the image becomes wider as the projection distance increases, a larger sampling area for the sampling window is set. In other words, the original image is relatively reduced in size.

The image output unit 300 outputs a corresponding light control signal based on the output image transmitted by the image generation unit 200. That is, the image output unit 300 includes the light source unit, and since a process of receiving and outputting the light control signal by the light source unit corresponds to an ordinary technology, a detailed description thereof will be omitted.

With the communication lighting system with an automatic image transformation function as described above, a resolution may be uniformly changed according to a resolution of the output unit (lamp) regardless of a difference in resolution of an original image to be projected through the lamp. Therefore, it is possible to increase convenience in the use of the communication lighting system, which is advantageous.

Although the preferred embodiments of the present invention have been described above, the embodiments disclosed in the present invention are not intended to limit the technical spirit of the present invention, but are only for explanation. Therefore, the technical spirit of the present invention includes not only each disclosed embodiment, but also a combination of the disclosed embodiments, and furthermore, the scope of the technical spirit of the present invention is not limited by these embodiments. In addition, many changes and modifications of the present invention may be made by those skilled in the art to which the present disclosure pertains without departing from the spirit and scope of the accompanying claims. In addition, it is to be considered that all of these changes and modifications fall within the scope of the present invention.

What is claimed is:

1. A communication lighting system with an automatic image transformation function, the communication lighting system comprising:
   a condition setting unit configured for setting an output condition for an output image having a first resolution;
   an image generation unit configured for generating a sampling window having a same resolution as the first resolution of the output image and generating the output image by applying the sampling window to an original image having a second resolution according to the output condition set by the condition setting unit; and
   an image output unit including at least one light source and configured for outputting a corresponding light control signal based on the output image,
   wherein, when the first resolution and the second resolution are different from each other, the image generation unit is configured to:
     apply the sampling window to a portion of the original image and calculate the output image by sampling the original image to which the sampling window is applied; or
     apply the sampling window in such a way that the original image is entirely within the sampling window and calculate the output image by sampling the original image to which the sampling window is applied,
     wherein a value of each pixel of the output image is determined based on a value of a pixel of the original image at a sampling position corresponding to a position of each pixel of the output image.

2. The communication lighting system of claim 1, wherein;
   when the second resolution is lower than the first resolution, a value of each pixel of the output image is determined based on a value of a pixel of the original image at a sampling position corresponding to a position of each pixel of the output image when the original image exists at the sampling position, and
   the value of each pixel of the output image is set to a predetermined value when the original image does not exist at the sampling position.

3. The communication lighting system of claim 1, wherein the image generation unit applies the sampling window in such a way that a center point of the sampling window and a center point of the original image coincide with each other.

4. A communication lighting system with an automatic image transformation function, comprising:
   a condition setting unit configured for setting an output condition for an output image having a first resolution;
   an image generation unit configured for generating a sampling window having a same resolution as the first resolution of the output image and generating the output image by applying the sampling window to an input original image having a second resolution according to the output condition set by the condition setting unit; and
   an image output unit including at least one light source and configured for outputting a corresponding light control signal based on the output image,
   wherein the image generation unit generates the sampling window such that sampling areas, which are areas by which sampling for respective pixels of the sampling window is performed, are the same as each other.

5. The communication lighting system of claim 1, wherein the image generation unit generates the sampling window in such a way that a sampling area, which is an area by which sampling for each pixel of the sampling window is performed, gradually decreases in one direction.

6. A communication lighting system with an automatic image transformation function, comprising:
   a condition setting unit configured for setting an output condition for an output image having a first resolution;
   an image generation unit configured for generating a sampling window having a same resolution as the first resolution of the output image and generating the output image by applying the sampling window to an input original image having a second resolution according to the output condition set by the condition setting unit; and
   an image output unit including at least one light source and configured for outputting a corresponding light control signal based on the output image,
   wherein the image generation unit generates the sampling window in such a way that a sampling area, which is an area by which sampling for each pixel of the sampling window is performed, varies depending on a projection distance of the output image received by the condition setting unit.

7. The communication lighting system of claim 6, wherein the image generation unit generates the sampling window in such a way that a sampling area, which is an area by which sampling for each pixel of the sampling window is performed, increases as the received projection distance of the output image increases.

8. The communication lighting system of claim 1, wherein:

the image generation unit sets, in a case where a position of one pixel of the original image corresponds to any one pixel of the sampling window, a color value of a corresponding pixel of the output image based on a value of the corresponding pixel of the original image, and the image generation unit further sets, in a case where positions of two or more pixels of the original image correspond to any one pixel of the sampling window, a color value of a corresponding pixel of the output image by applying a weight for a value of each pixel based on areas occupied by the corresponding pixels of the original image.

\* \* \* \* \*